United States Patent
Sogabe (10) Patent No.: US 8,917,360 B2
(45) Date of Patent: Dec. 23, 2014

(54) ELECTRONIC DEVICE

(71) Applicant: Sony Computer Entertainment Inc., Tokyo (JP)

(72) Inventor: Takashi Sogabe, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 13/861,745

(22) Filed: Apr. 12, 2013

(65) Prior Publication Data
US 2013/0271671 A1 Oct. 17, 2013

(30) Foreign Application Priority Data
Apr. 16, 2012 (JP) ................. 2012-093206

(51) Int. Cl.
| H04N 9/64 | (2006.01) |
| H04N 9/77 | (2006.01) |
| G06F 1/16 | (2006.01) |
| F21V 8/00 | (2006.01) |
| H04N 5/50 | (2006.01) |
| H04N 5/64 | (2006.01) |

(52) U.S. Cl.
CPC ............ G06F 1/16 (2013.01); G02B 6/0001 (2013.01); H04N 5/50 (2013.01); H04N 5/64 (2013.01)
USPC ......................................... 348/731; 348/714

(58) Field of Classification Search
CPC ....... H04N 5/64; G06F 1/1601; G06F 1/1607; G06F 1/1632; H05K 5/0278; H01R 13/664
USPC .......................................... 348/725, 731, 714
See application file for complete search history.

(56) References Cited

U.S. PATENT DOCUMENTS 7,471,511 B2 * 12/2008 Montag et al. ........... 361/679.41
7,595,981 B2 * 9/2009 Chen et al. ............... 361/679.44
7,920,386 B2 * 4/2011 Tsao et al. .................... 361/755

(Continued)

FOREIGN PATENT DOCUMENTS

| JP | 2004083105 A | 3/2004 |
| JP | 2007095174 A | 4/2007 |

(Continued)

OTHER PUBLICATIONS

Office Action for corresponding Japanese Patent APplication No. 2012-093206, dated Feb. 25, 2014.

*Primary Examiner* — Brian Yenke
(74) *Attorney, Agent, or Firm* — Matthew B. Dernier, Esq.; Gibson & Dernier LLP (57) ABSTRACT

To provide an electronic device capable of preventing an enclosure from falling down without providing a stand and also improving heat dissipation of the enclosure. An electronic device (1) according to the present invention has a substrate (3) where a data storage unit (5) incorporating a storage medium is mounted, and a columned enclosure (2) for storing the substrate (3) in a standing posture, with an axial direction thereof directed to the vertical direction. The enclosure (2) has a pair of lateral walls (22, 23) opposite to the substrate (3) in the Y1-Y2 direction. The pair of lateral walls (22, 23) have a curved shape curved so that middle portions in the Z1-Z2 direction depart from the substrate (3) more than the respective both ends in the Z1-Z2 direction.

9 Claims, 8 Drawing Sheets

(56) References Cited

U.S. PATENT DOCUMENTS

| | | | | |
|---|---|---|---|---|
| D640,705 S | * | 6/2011 | Sogabe | D14/447 |
| 8,545,241 B2 | * | 10/2013 | Wang et al. | 439/131 |
| 2007/0074233 A1 | | 3/2007 | Moriya | |

FOREIGN PATENT DOCUMENTS

| | | |
|---|---|---|
| JP | 2008036516 A | 2/2008 |
| JP | 2008077773 A | 4/2008 |
| JP | 2011219115 A | 11/2011 |

* cited by examiner

FIG.1

1. Electronic Device
2. Enclosure
22. Lateral Walls
22a. Notches
23. Lateral Wall
23a. Notches
24. Rectangular Frame
27. Front Wall
27a. Insertion Hole
92. Elastic Sheet
221. Peripheries
231. Peripheries

FIG.2

1. Electronic Device
2. Enclosure
3. Circuit Board
4. Tuner Unit
5. Data Storage Unit
6. Semiconductor chip
22. Lateral walls
22a. Notches
22d. Concave portion
23. Lateral Wall
23a. Notches
24. Rectangular frame
25. Upper Wall
27. Front wall
29. Projected Portion
43. Coaxial Cable Terminals
94. Screw
221. Peripheries
223. Brackets
231. Peripheries
233. Brackets

FIG.3

| | |
|---|---|
| 1. | Electronic Device |
| 2. | Enclosure |
| 3. | Circuit Board |
| 4. | Tuner Unit |
| 5. | Data Storage Unit |
| 6. | Semiconductor Chip |
| 23. | Lateral wall |
| 27. | Front wall |
| 27a. | Insertion hole |
| 28. | Rear wall |
| 29. | Projected portion |
| 43. | Coaxial cable terminals |
| 45. | Coaxial cable terminals |
| 71. | Power port |
| 72. | Local Area Network Port |
| 73. | Universal Serial Bus Port |
| 74. | Switches |
| 75. | Switches |
| 76. | Light emitting devices |
| 84. | Buttons |
| 85. | Buttons |
| 92. | Elastic sheet |
| 94. | Screw |
| 281. | End Surface |
| 292. | Convex curved surface |

FIG.5

1. Electronic Device
2. Enclosure
22. Lateral walls
22a. Notches
22c. Card insertion slot
22e. Concave portion
23. Lateral wall
23a. Notches
24. Rectangular frame
28. Rear wall
43. Coaxial cable terminals
45. Coaxial cable terminals
71. Power port
72. Local Area Network Port
73. Universal Serial Bus Port
84. Buttons
85. Buttons
92. Elastic sheet
221. Peripheries
231. Peripheries
281. End surface
292. Convex curved surface

FIG.6

3. Circuit Board
4. Tuner Unit
5. Data Storage Unit
6. Semiconductor Chip
22. Lateral walls
22a. Notches
24. Rectangular frame
25. Upper Wall
26. Lower wall
27. Front wall
28. Rear wall
29. Projected portion
41. Main body
43. Coaxial cable terminals
45. Coaxial cable terminals
71. Power port
72. Local Area Network Port
73. Universal Serial Bus Port
76. Light emitting devices
82. Light guide member
84. Buttons
85. Buttons
94. Screw
221. Peripheries
264. Nail portions
271. Non-light transmissive member
274. Light transmissive member
276. Engaging holes
281. End Surface

FIG.7

3. Circuit Board
5. Data Storage Unit
22. Lateral walls
22a. Notches
23. Lateral wall
23a. Notches
24. Rectangular frame
25. Upper Wall
221. Peripheries
224. Inner surface
225. Outer surfaces
228. Reinforcing ribs
231. Peripheries
234. Inner surface
235. Outer surfaces
238. Nail portions
239. Reinforcing ribs
252. Outer surface
253. Outer surface

FIG.8

3. Circuit Board
5. Data Storage Unit
22. Lateral walls
22a. Notches
23. Lateral wall
23a. Notches
27. Front wall
27a. Insertion hole
27b. Insertion hole
76. Light emitting devices
82. Light guide member
221. Peripheries
224. Inner surface
225. Outer surfaces
231. Peripheries
234. Inner surface
235. Outer surfaces
271. Non-light transmissive member
272. Outer surface
273. Outer surface
272. Light transmissive member
278. Projected portion
823. End portion
825. Rear end portion
827. Mount portion

ELECTRONIC DEVICE

CROSS-REFERENCE TO RELATED APPLICATIONS

The present application claims priority from Japanese application JP 2012-093206 filed on Apr. 16, 2012, the content of which is hereby incorporated by reference into this application.

BACKGROUND OF THE INVENTION

1. Field of the Invention

The present invention relates to an electronic device, and in particular, to improvement of functionality by the shape of the external appearance thereof.

2. Description of the Related Art

Conventionally, there has been known an electronic device having a rectangular box-shaped enclosure for storing a substrate having a hard disk drive (HDD) mounted thereon, the electronic device for use with the enclosure in a standing posture.

SUMMARY OF THE INVENTION

In order to prevent the enclosure from falling down, such an electronic device requires a stand wider than the thickness of the enclosure attached to the lower end of the enclosure. Further, because heat is generated by the HDD or other electronic components mounted on the substrate, it is necessary to improve heat dissipation of the enclosure.

The present invention aims to provide an electronic device capable of preventing the enclosure from falling down without providing a stand, and capable of improving heat dissipation of the enclosure.

In order to achieve the above described object, an electronic device according to the present invention includes a substrate having a data storage unit mounted thereon, the data storage unit incorporating a storage medium; and a columned enclosure for storing the substrate in a standing posture, the enclosure having an axial direction directed in a vertical direction. The enclosure has a pair of lateral walls opposite to the substrate in a thickness direction of the substrate. When the axial direction of the enclosure is defined as a first direction, the thickness direction of the substrate is defined as a second direction, and a direction orthogonal to these directions is defined as a third direction, the pair of lateral walls has a curved shape curved so that middle portions in the third direction depart from the substrate in the second direction more than respective both ends in the third direction.

According to the present invention, it is possible to prevent the enclosure from falling down without providing a stand_by forming a pair of lateral walls in a curved shape. Further, as heat can readily convect in the space formed between the pair of lateral walls and the substrate, it is possible to improve heat dissipation of the enclosure.

DETAILED DESCRIPTION OF THE INVENTION

An embodiment of an electronic device according to the present invention will be described with reference to the accompanying drawings.

Figure 6:
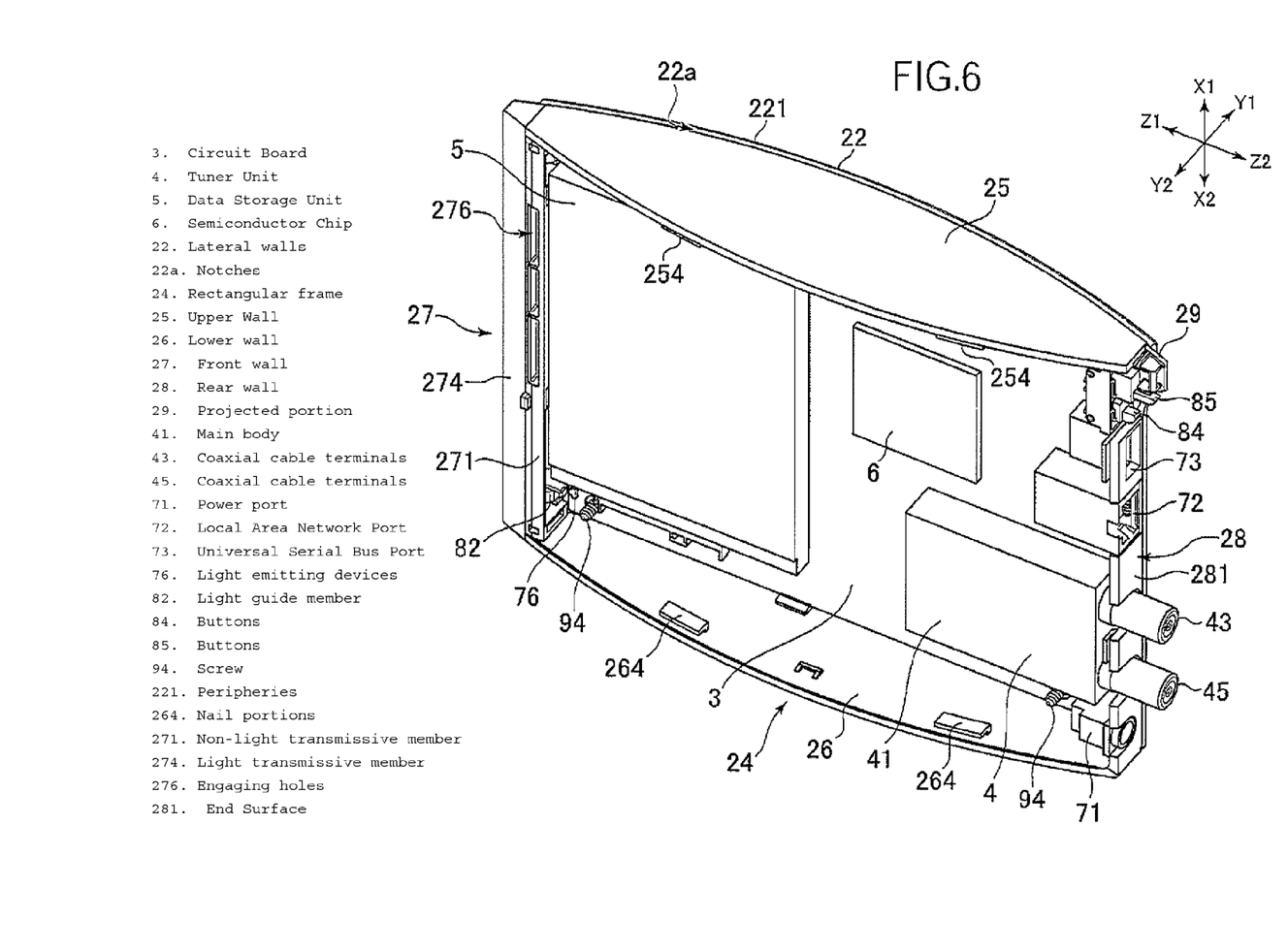
FIG. 6 is a perspective view of the electronic device, showing the left side surface of the electronic device with the left lateral wall removed, viewed diagonally.
Figure 7:
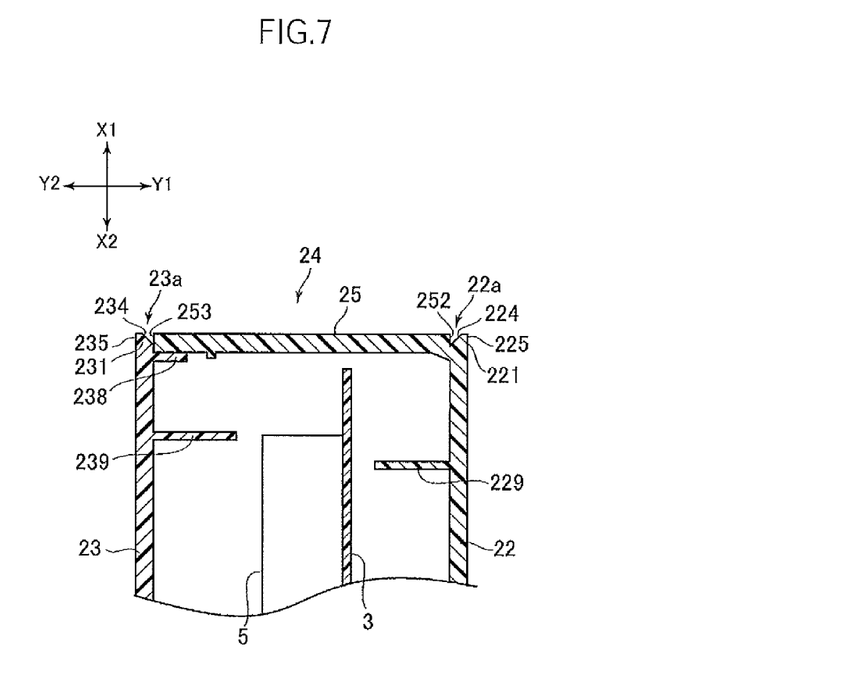
FIG. 7 is a cross sectional view of the electronic device with the cross section along the line VII-VII in FIG. 2.
Figure 8:
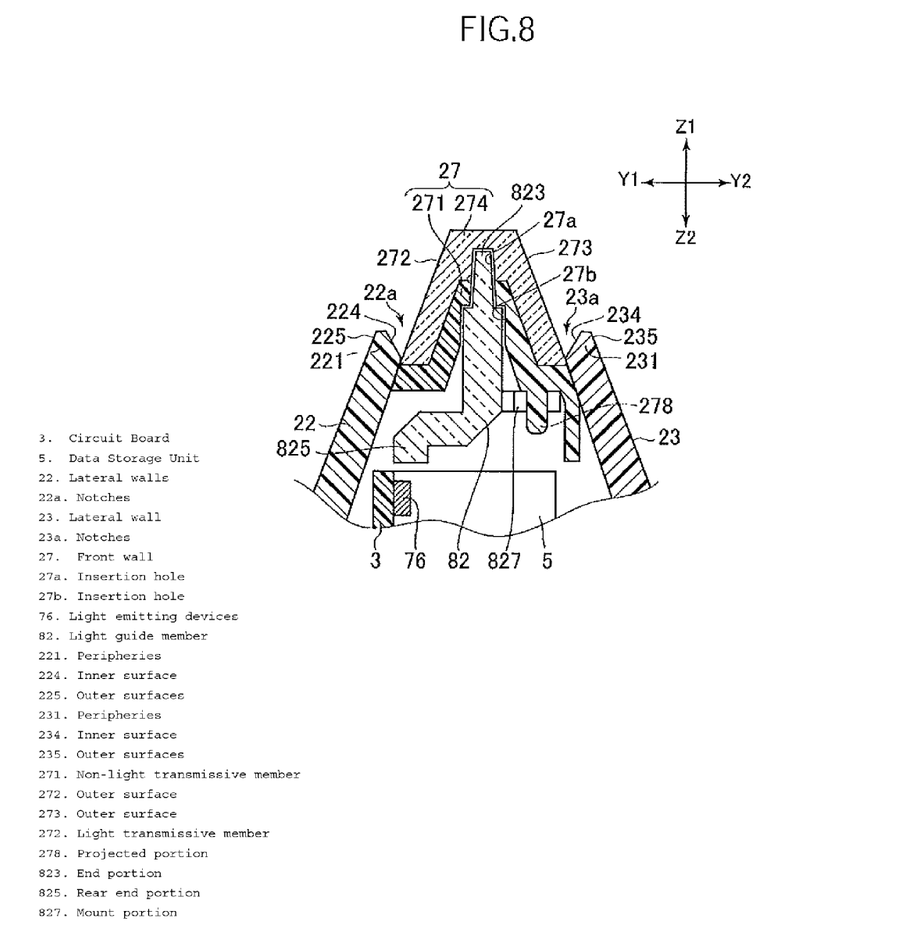
FIG. 8 is a cross sectional view of the electronic device with the cross section along the line VIII-VIII in FIG. 1.

FIGS. 1 to 5 are a front view, a top view, a left side view, a right side view, and a rear view of an electronic device 1 according to one embodiment of the present invention. FIG. 6 is a perspective view of the electronic device 1. FIGS. 7 and 8 are cross sectional views of the electronic device 1. In the description below, the directions indicated by X1, X2, Y1, Y2, Z1, Z2 in these diagrams correspond to the upward, downward, rightward, leftward, forward, and rearward directions, respectively.

The electronic device 1 is, for example, an electronic device that functions as a digital terrestrial TV tuner and a hard disk recorder. The electronic device 1 has a communication function for communicating via wired or radio with an external electronic device, such as, for example, a consumer game device or the like.

The electronic device 1 has an enclosure 2 in a substantially columned shape with the axial direction thereof directed in the up-down direction (vertical direction) and a substrate 3 stored in a standing posture in the enclosure 2. The enclosure 2 is molded from plastic material. Note here that a substantially columned shape refers to a shape of which cross sections orthogonal to the axial direction all have the substantially same shape and size, and are continuous in the axial direction. A horizontal cross section of the enclosure 2 has a spindle shape that is relatively bulky at the middle portion thereof in the front-back direction and becomes thinner as it goes toward the respective both ends thereof in the front-back direction. The substrate 3 is a circuit board having an electric circuit mounted on an insulating substrate, and stored in the enclosure 2 in a posture in which the longitudinal direction, width direction, and thickness direction thereof are directed in the front-back direction, up-down direction, and left-right direction, respectively.

The substrate 3 has a tuner unit 4, a data storage unit 5, and a semiconductor chip 6 all mounted thereon. The tuner unit 4 receives a broadcasting signal of a selected channel, and restores video data from the broadcasting signal through decoding. The tuner unit 4 includes a rectangular box-shaped main body 41 and input and output coaxial cable terminals 43, 45 extending rearward from the main body 41 to project out of the rear wall 28 of the enclosure 2.

The data storage unit 5 includes a storage device incorporating a storage medium, such as a hard disk drive (HDD) or the like, and stores video data. The data storage unit 5 is formed in a rectangular box shape, and mounted on the substrate 3 in a posture in which the longitudinal direction, width direction, and thickness direction thereof are directed in the up-down direction, front-back direction, and left-right direction, respectively. Note that the data storage unit 5 is not limited to an HDD, but may be, for example, a solid state drive (SSD) or the like.

The semiconductor chip 6 controls an operation of the electronic device 1. For example, the semiconductor chips 6 controls operations including one for sending video data generated by the tuner unit 4 to the data storage unit 5 and one for sending video data generated by the tuner unit 4 or stored in the data storage unit 5 to an external electronic device. The semiconductor chip 6 may have a heat sink.

The substrate 3 has a power port 71, a LAN (Local Area Network) port 72, and a USB (Universal Serial Bus) port 73 attached to the rear end portion thereof. The rear surface of the enclosure 2 constitutes an interface portion where the coaxial cable terminals 43, 45, the power port 71, the LAN port 72, and the USB port 73 are formed aligned in the up-down direction.

The substrate 3 further has a plurality of switches 74, 75 mounted thereon near the upper end of the rear end portion thereof. The switches 74, 75 are, for example, a reset switch and a power switch. A plurality of buttons 84, 85 corresponding to the respective switches 74, 75 are mounted on the rear surface of the enclosure 2. Positions of the buttons 84, 85 will be described later in detail.

The substrate 3 further has a plurality of light emitting devices 76 mounted on the front end portion thereof. Lighting of the respective light emitting devices 76 indicates, for example, a powered-on state, LAN access, HDD access, and so forth. A structure for introducing the light from each light emitting device 76 to an insertion hole 27a formed on the front wall 27 of the enclosure 2 so that the light can be visibly recognizable from outside will be described later in detail.

In the following, a detailed structure of the enclosure 2 will be described. The enclosure 2 has a lateral wall 22 positioned to the right of the substrate 3, a lateral wall 23 positioned to the left of the substrate 3, an upper wall 25 positioned above the substrate 3, a lower wall 26 positioned below the substrate 3, a front wall 27 positioned ahead of the substrate 3, and a rear wall 28 positioned behind the substrate 3. Of these, the lateral walls 22, 23 are positioned opposite to the respective surfaces of the substrate 3 in the standing posture so as to together sandwich the substrate 3. Further, the upper wall 25, the lower wall 26, the front wall 27, and the rear wall 28 are positioned along the peripheries of the substrate 3, constituting a rectangular frame 24 enclosing the substrate 3 in the front-back direction. Still further, the lateral wall 22, the upper wall 25, the lower wall 26, and the rear wall 28 are molded as an integral molded component, while the lateral wall 23 and the front wall 27 are formed as separate components removable with respect to the molded component.

The lateral walls 22, 23 have a curved shape of which middle portion in the front-back direction is curved outward in the left-right direction so as to depart from the substrate 3 more than the respective both end portions thereof in the front-back direction. Specifically, the lateral walls 22, 23 are positioned farthest from the substrate 3 at the middle of the enclosure 2 and the substrate 3 in the front-back direction (the position indicated by line VII-VII in FIG. 2), and get gradually closer to the substrate 3 as it goes away from the middle in the front-back direction to be positioned closest to the substrate 3 at the respective both ends thereof in the front-back direction. The lateral walls 22, 23 have a symmetrical curved shape relative to the middle in the left-right direction of the enclosure 2. The lateral walls 22, 23 have a partial columned shape that constitutes a part of a column sufficiently large as compared with the electronic device 1.

Figure 2:
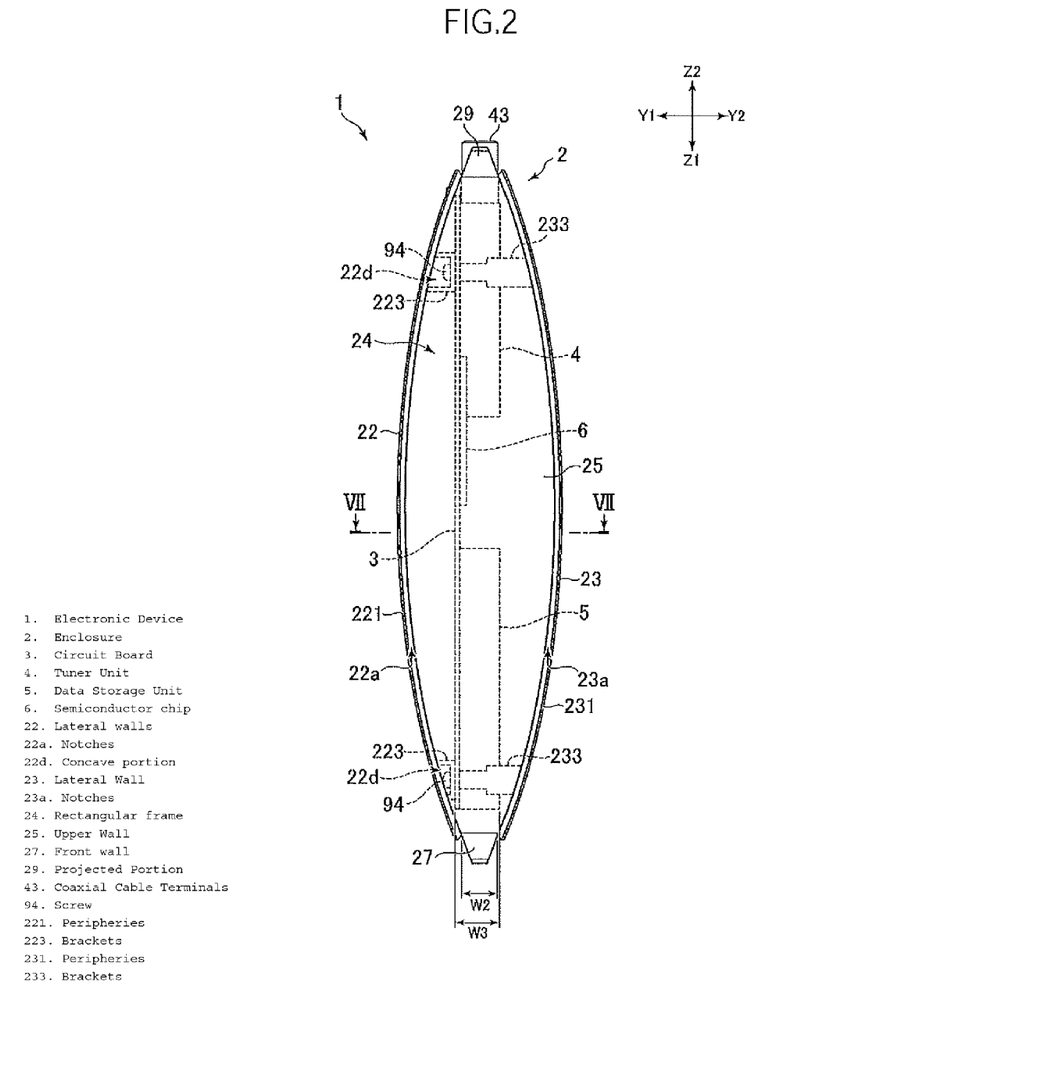
FIG. 2 is a top view of the electronic device.

The front ends of the lateral walls 22, 23 are positioned more forward than the front end of the substrate 3, while the rear ends of the lateral walls 22, 23 are positioned more rearward than the rear end of the substrate 3 (see FIG. 2). The interval W2 between the front ends of the lateral walls 22, 23, that is, the minimum interval between the lateral walls 22, 23 is smaller than the total thickness W3 of the substrate 3 and the data storage unit 5. The interval W2 between the front ends of the lateral walls 22, 23 is smaller than the total thickness of the substrate 3 and the tuner unit 4. In the example shown, the thickness of the tuner unit 4 is substantially the same as that of the data storage unit 5. The interval between the rear ends of the lateral walls 22, 23 is substantially the same as the interval W2 between the front ends (though only near a projected portion 29).

The substrate 3 stored in the enclosure 2 is positioned offset to the right relative to the middle of the enclosure 2 in the left-right direction, and mounted on the right lateral wall 22 (see FIG. 2). The position of the substrate 3 in the left-right direction is the same as or more to the right than those of the respective both ends of the right lateral wall 22 in the front-back direction. The tuner unit 4, the data storage unit 5, and the semiconductor chip 6 are mounted on the left surface of the substrate 3. The middle of the tuner unit 4 and that of the data storage unit 5 in the left-right direction are positioned closer to the middle of the enclosure 2 in the left-right direction than that of the substrate 3, being substantially coincident with the middle of the enclosure 2 in the left-right direction.

Specifically, the right lateral wall 22 has a plurality of brackets 223 formed thereon projecting toward inside in the left-right direction and contacting the right surface of the substrate 3 (see FIG. 2). Further, the left lateral wall 23 as well has a plurality of brackets 233 formed thereon extending toward inside in the left-right direction and contacting the left surface of the substrate 3. The brackets 223, 233 are fixed to each other by a screw 94 with the substrate 3 in-between. Specifically, the screw 94 is inserted into a concave portion 22d formed on the outer surface of the right lateral wall 22 corresponding to the bracket 223. A cover 227 for covering the concave portion 22d where the screw 94 is inserted is provided on the outer surface of the right lateral wall 22 (see FIG. 4).

Figure 5:
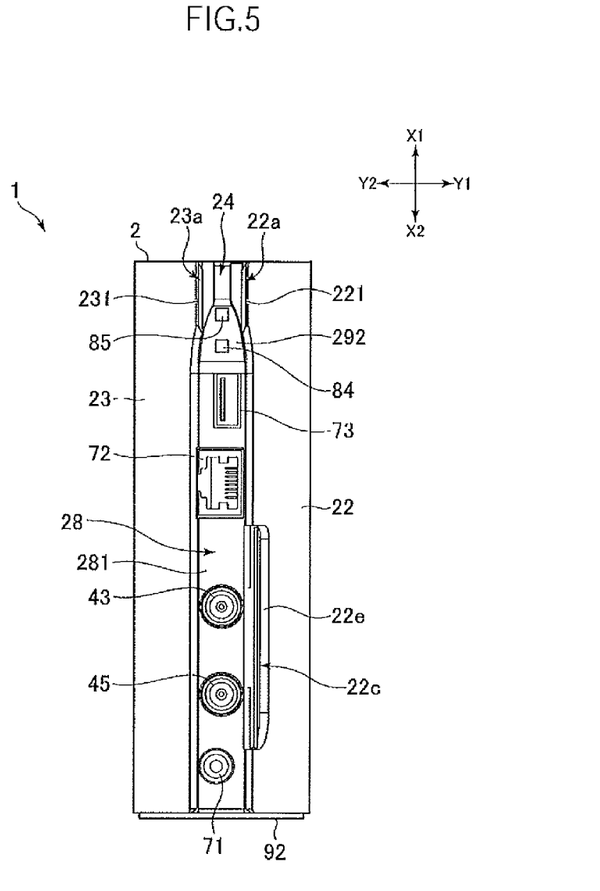
FIG. 5 is a rear view of the electronic device.

Further, a concave portion 22e is formed on the rear end portion of the right lateral wall 22, and a card insertion slot 22c is formed in the concave portion 22e so as to penetrate in the front-back direction (see FIG. 5). A B-CAS card storing an encryption key for decoding a broadcasting signal is inserted into the card insertion slot 22c (B-CAS is a registered trademark). The B-CAS card inserted in the card insertion slot 22c is opposed to the substrate 3 positioned offset to the right in the enclosure 2, and contacts a contact point (not shown) formed on the right surface of the substrate 3.

Of the tuner unit 4, the data storage unit 5, and the semiconductor chip 6 all mounted on the substrate 3, the data storage unit 5, having the largest occupied area, is positioned more forward than the middle of the substrate 3 in the front-back direction (the position indicated by the line VII-VII in FIG. 2). Specifically, the front end of the data storage unit 5 is substantially aligned with the front end of the substrate 3, while the rear end of the data storage unit 5 is positioned slightly away to the front from the middle of the substrate 3 in the front-back direction 3. Meanwhile, the tuner unit 4 and the semiconductor chip 6 are positioned more rearward than the middle of the substrate 3 in the front-back direction. The tuner unit 4 is positioned closer to the rear end of the lower half of the substrate 3 such that the coaxial cable terminals 43, 45 project rearward out of the rear wall 28 of the enclosure 2. The semiconductor chip 6 is positioned behind the data storage unit 5 and above the tuner unit 4, being closer to the middle of the substrate 3 in the front-back direction than the tuner unit 4 and the data storage unit 5.

The substrate 3 is stored in the space defined by the right lateral wall 22 and the frame 24 (see FIG. 6), and thereafter, the left lateral wall 23 is attached to the frame 24, whereby the enclosure 2 is completed. The bottom surface of the enclosure 2 has a slip stop and vibration absorbing elastic sheet 92 attached thereon. As shown in FIG. 6, a plurality of nail portions 254, 264 and engaging holes 276 for mounting the left lateral wall 23 on are formed on the frame 24. Meanwhile, as shown in FIG. 7, nail portions 238 for being attached to the frame 24 are formed projecting to the right on the left lateral wall 23 as well in the vicinity of the periphery 231. In addition, reinforcing ribs 229, 239 are formed on the respective inner surfaces of the lateral walls 22, 23, extending in the front-back direction.

Figure 1:
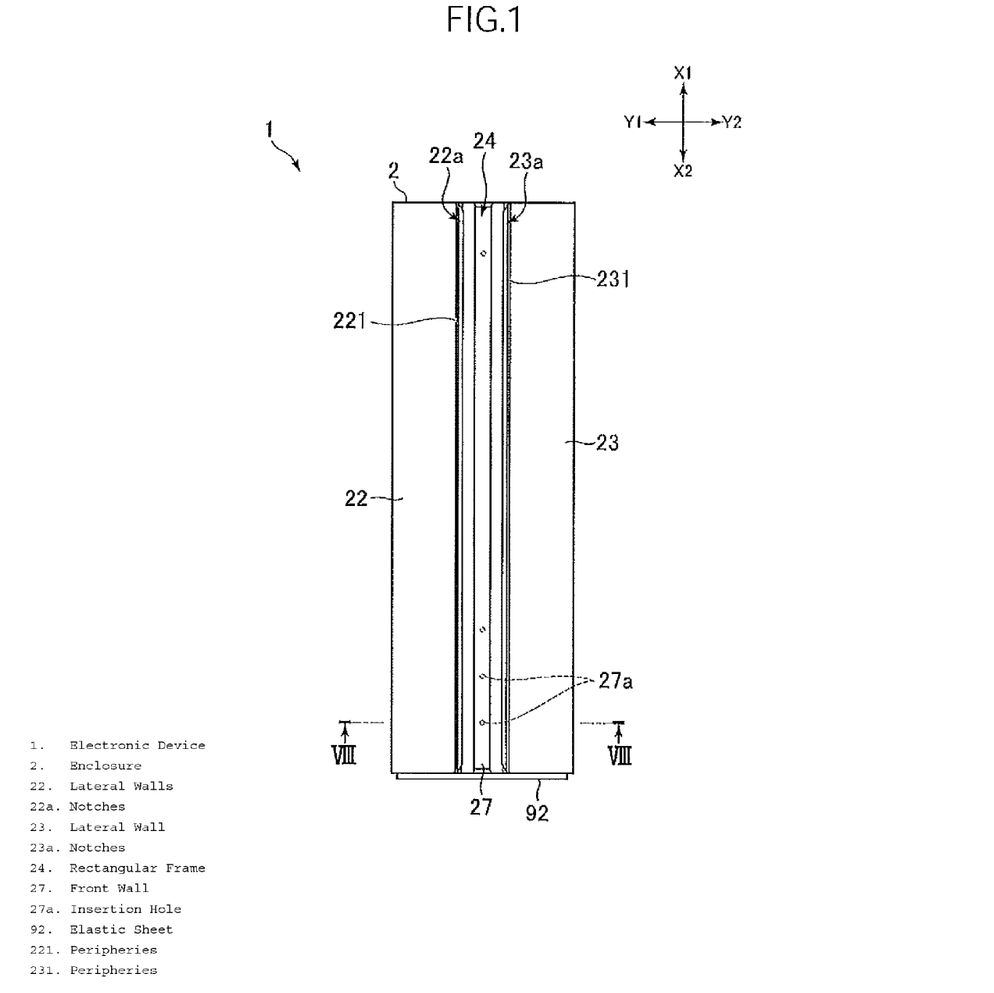
FIG. 1 is a front view of an electronic device according to one embodiment of the present invention.

As shown in FIGS. 1, 2, and 5, notches 22a, 23a are formed on the outer surface of the enclosure 2 between the respective peripheries 221, 231 of the respective lateral walls 22, 23 and the frame 24 positioned between the peripheries 221, 231, extending along the respective peripheries 221, 231. The peripheries 221, 231 of the respective lateral walls 22, 23 are shaped tapered. Note here that the frame 24 has the upper wall 25, the lower wall 26, the front wall 27, and the rear wall 28, and that the notches 22a, 23a are formed between these and the respective peripheries 221, 231. As to the rear wall 28, however, the notches 22a, 23a are formed only in the vicinity of the projected portion 29. The notches 22a, 23a are formed at respective positions inside in the left-right direction relative to the respective peripheries 221, 231, being cut toward inside in the front-back or up-down direction.

As shown in FIG. 7, on the upper end portion of the enclosure 2, notches 22a, 23a are formed in a substantially V-shape, being each defined by the outer surface 252, 253 of the upper wall 25 in the left-right direction and the inner surface 224, 234 of the periphery 221, 231 in the left-right direction. The outer surfaces 252, 254 of the upper wall 25 in the left-right direction are surfaces in parallel to the up-down direction, while the inner surfaces 224, 234 of the respective peripheries 221, 231 are surfaces inclined toward outside in the left-right direction as it goes toward the tip end. As the outer surfaces 225, 235 of the respective peripheries 221, 231 are surfaces extending along the respective outer surfaces of the lateral walls 22, 23 and are not inclined in either side in the left-right direction, the peripheries 221, 231 become thinner as it goes toward the tip end and the middle thereof in the left-right direction is shifting toward outside. The depth of each notch 22a, 23a is, for example, about a half of the thickness of the upper wall 25. Note that notches 22a, 23a similar to those in the example shown in FIG. 7 are formed on the lower end portion of the enclosure 2 as well.

As shown in FIG. 8, on the front end portion of the enclosure 2, notches 22a, 23a are formed in a substantially V-shape, being each defined by the outer surface 272, 273 in the left-right direction of the front wall 27 in a trapezoid columned shape and the inner surface 224, 234 of the periphery 221, 231 in the left-right direction. As the outer surfaces 272, 273 in the left-right direction of the front wall 27 in a trapezoid columned shape are inclined toward inside in the left-right direction as it goes forward and the peripheries 221, 231 themselves also are slightly inclined toward inside in the left-right direction, the angle of each notch 22a, 23a is similar to that in the example shown in FIG. 7. Note that notches 22a, 23a similar to those in the example shown in FIG. 8 are formed in the vicinity of the projected portion 29 on the rear end portion of the enclosure 2 as well.

As shown in FIG. 8, the front wall 27 in a trapezoid columned shape is positioned at the front end of the enclosure 2, and has a non-light transmissive member 271 and a mountain-like light transmissive member 274 positioned ahead of the non-light transmissive member 271, in which the non-light transmissive member 271 has a convex shape with the middle portion thereof in the left-right direction projecting forward, and the light transmissive member 274 projects forward. The front wall 27 is obtained through double color molding using non-light transmissive resin for the non-light transmissive member 271 and light-transmissive resin for the light transmissive member 274. As the non-light transmissive member 271 is positioned behind the light transmissive member 274, the inside of the enclosure 2 is not seen from outside. A columned insertion hole 27a is formed open rearward on the front end portion of the light transmissive member 274. Further, a columned insertion hole 27b is formed open forward and rearward on the front end portion of the non-light transmissive member 271, being continuous from the insertion hole 27a formed on the light transmissive member 274.

A light guide member 82 is mounted on the front wall 27 for introducing the light from the light emitting device 76 mounted on the front end portion of the substrate 3 to the insertion hole 27a formed on the light transmissive member 274. The columned front end portion 823 of the light guide member 82 is inserted into the insertion holes 27a, 27b formed on the front wall 27, and the rear end portion 825 thereof is bent into an L shape so as to be opposite to the light emitting device 76 mounted on the substrate 3. The light guide member 82 has a mount portion 827 for fitting with a projected portion 278 formed on the non-light transmissive member 271. The light incident from the light emitting device 76 into the rear end portion 825 is introduced into the front end portion 823 inserted in the insertion hole 27a, so that the light can be seen from outside through the light transmissive member 274. The light introduced into the insertion hole 27a appears round in the front view, and rectangular in the side view. As the non-light transmissive member 271 is formed convex so that the insertion hole 27a is positioned more forward than the rear end of the light transmissive member 274, the light having been introduced into the insertion hole 27a appears floating in the light transmissive member 274.

Figure 3:
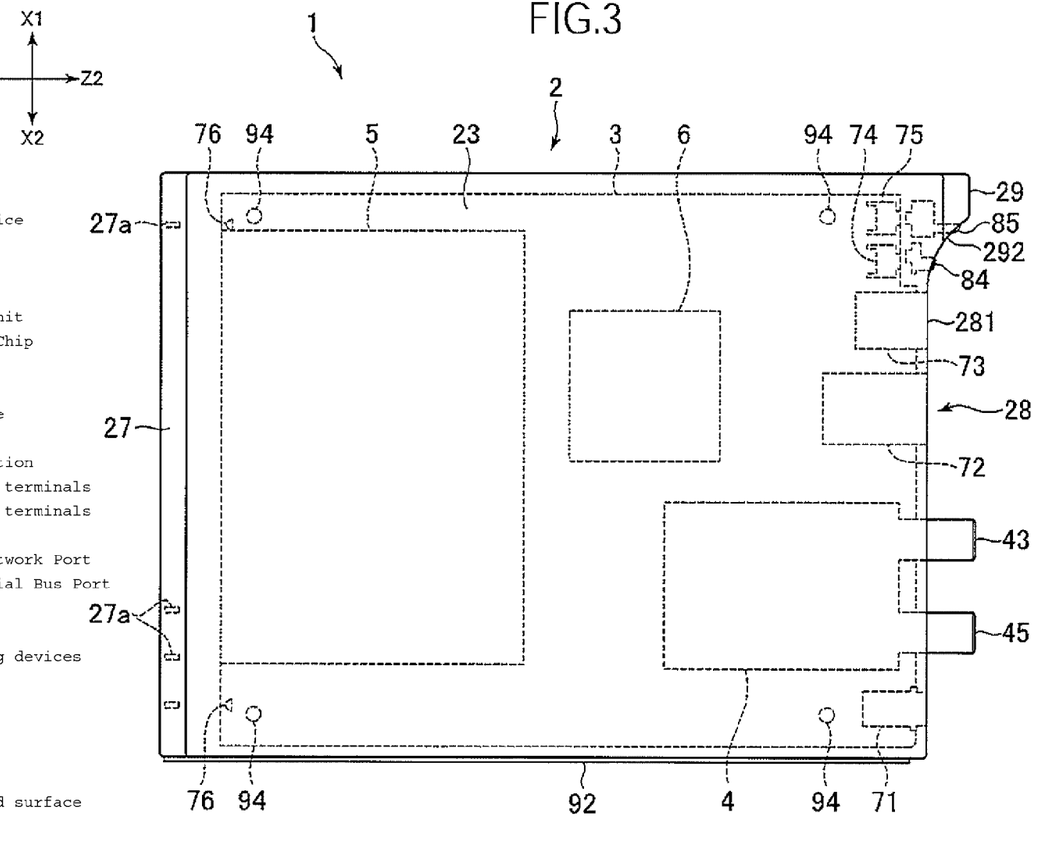
FIG. 3 is a left side view of the electronic device.
Figure 4:
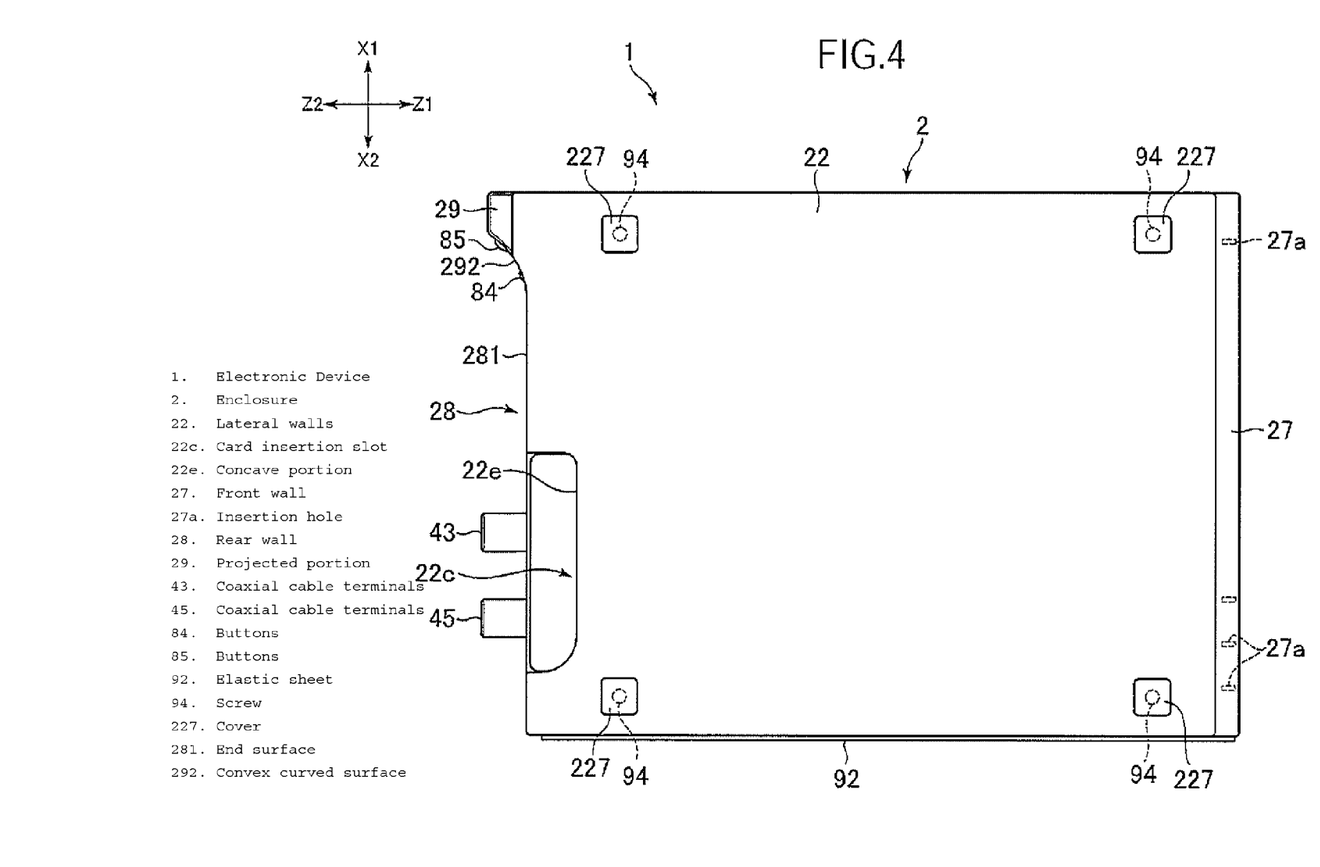
FIG. 4 is a right side view of the electronic device.

As shown in FIG. 3, the projected portion 29 is formed projecting rearward in the vicinity of the upper end of the rear wall 28 of the enclosure 2. The projected portion 29 has a trapezoid columned shape that becomes smaller in the width as it goes rearward and projects rearward beyond the end surface 281 where the coaxial cable terminals 43, 45, the USB port 73, and so forth are formed. A convex curved surface 292 is formed below the projected portion 29, being continuous from the end surface 281 and projecting upward and forward. A plurality of buttons 84, 85 are aligned in the up-down direction on the curved surface 292. The rear end portion of each button 84, 85 slightly projects rearward from an opening formed on the curved surface 292, and has a round surface inclined along the curved surface 292. Note that a part of the projected portion 29 including the curved surface 292 belongs to the left lateral wall 23 (see FIG. 6).

Of the plurality of buttons 84, 85, it is relatively easy to press the button 84 at a lower position as the button 84 is positioned in an area on the curved surface 292 that has relatively moderate inclination relative to the rear wall 28. Thus, a button with relatively high frequency of use, for example, a reset button, is assigned to the lower button 84. Meanwhile, it is relatively difficult to press the button 85 at a higher position as the button 85 is positioned in an area on the curved surface 292 that has relatively sharp inclination relative to the rear wall 28. Thus, a button with a relatively low frequency of use, for example, a power button, is assigned to the upper button 85. According to this aspect, chances of erroneous pressing of a button can be reduced as a button with lower frequency of use is more difficult to be pressed.

According to the above-described embodiment, as each lateral wall 22, 23 of the enclosure 2 has a curved surface, it is possible to prevent the enclosure 2 from falling down without providing a stand. Specifically, setting the maximum interval between the lateral walls 22, 23 to, for example, twice or more as large as the total thickness of the substrate 3 and the data storage unit 5 makes it possible to prevent the enclosure 2 from falling down in the left-right direction. Note that the maximum interval between the lateral walls 22, 23 is desirably determined in consideration of prevention of the enclosure 2 from falling down. Further, as each lateral wall 22, 23 has a curved shape, the fulcrum of the enclosure 2 when falling down is defined at a point away from the middle in the left-right direction, and moreover, a point at which an external force is applied to the enclosure 2 is defined at a point away from the middle. This can produce a higher falling-down preventing effect than a conventional art using a stand. Further, when an external force in the left-right direction is applied at a point away from the middle of the enclosure 2 in the left-right direction, the external force is dissolved into an in-surface component and an out-surface component of the curved outer surface, and the out-surface component, which contributes to falling-down, is reduced. Moreover, as the direction of the out-surface component comes to be closer to the middle in the front-rear direction of the enclosure 2, a higher falling-down preventing effect can be achieved even when an external force in the left-right direction is applied to a point away from the middle in the front-rear direction of the enclosure 2.

As each lateral wall 22, 23 of the enclosure 2 has a curved shape, a relatively large space is ensured between the lateral wall 22, 23 and the substrate 3. As this space promotes heat convection, it is possible to improve heat dissipation of the enclosure 2. As the substrate 3 is stored in the standing posture in the enclosure 2 and the lateral walls 22, 23, opposite to the surfaces of the substrate 3, both contribute to heat dissipation, higher heat dissipation of the substrate 3 can be achieved than that with the substrate 3 in a lying posture. Further, as each lateral wall 22, 23 of the enclosure 2 has a curved shape, it is possible to prevent excessive heat concentration when a plurality of electronic devices 1 are used aligned in the left-right direction by ensuring an interval space between the respective substrates 3. Still further, as each lateral wall 22, 23 of the enclosure 2 has a curved shape, and it is thus difficult to pile two or more electronic devices 1 in the thickness direction of the substrate 3, it is possible to avoid a manner of use disadvantageous in view of heat dissipation.

In the above-described embodiment, the distance in the left-right direction between each lateral wall 22, 23 and the middle of the substrate 3 in the front-back direction is larger than the distance in the left-right direction between each lateral wall 22, 23 and the respective both end portions of the substrate 3 in the front-back direction. With the above, a larger space can be ensured around the middle portion of the substrate 3 in the front-back direction than the space around the respective both end portions.

In the above-described embodiment, the interval W2 between the front/rear ends of the lateral walls 22, 23 is smaller than the total thickness W3 of the substrate 3 and the data storage unit 5. This can reduce the size of the front and rear end portions of the enclosure 2 while preventing the enclosure 2 from falling down and improving heat dissipation at the middle portion of the enclosure 2 in the front-back direction.

In the above-described embodiment, the tuner unit 4 is mounted on the substrate 3; the tuner unit 4 and the data storage unit 5 are mounted on the left surface of the substrate 3; and the substrate 3 is positioned offset to the right relative to the middle of the enclosure 2 in the left-right direction. This makes it possible to place the data storage unit 5 in the vicinity of the middle of the enclosure 2 in the left-right direction.

In the above-described embodiment, the tuner unit 4 and the semiconductor chip 6 are mounted on the substrate 3; the data storage unit 5 is positioned more forward relative to the middle of the substrate 3 in the front-back direction; and the tuner unit 4 and the semiconductor chip 6 are positioned more rearward relative to the middle of the substrate 3 in the front-back direction. This makes it possible to place the semiconductor chip 6 with larger heat generation at the middle of the substrate 3 in the front-rear direction where a relatively large interval relative to each lateral wall 22, 23 is ensured as the data storage unit 5 is positioned more forward relative to the middle of the substrate 3 in the front-back direction.

In the above-described embodiment, the enclosure 2 has the frame 24 provided between the peripheries 221, 231 of a pair of lateral walls 22, 23, for enclosing the substrate 3, and the notches 22a, 23a are formed on the outer surface of the substrate 2 between the respective peripheries 221, 231 and the frame 24, extending along the respective peripheries 221, 231. With the above, although the lateral walls 22, 23 and the frame 24 are actually integral, the notches 22a, 23a formed between the respective lateral walls 22, 23 and the frame 23 make it possible to appear as if the lateral walls 22, 23 and the frame 24 were separate entities from each other, without increasing the number of components of the enclosure 2. In detail, although the right lateral wall 22 is formed integral to the upper wall 25, the lower wall 26, and the rear wall 28, the notch 22a formed along the periphery 221 makes it possible to appear as if the right lateral wall 22 were a separate entity, without actually forming the right lateral wall 22 as a separate entity.

Further, according to this aspect, each of the peripheries 221, 231 of a pair of lateral walls 22, 23 may have a tapered shape in which an inner surface 224, 234 in the left-right direction is inclined toward outside. This makes it possible to appear as if lateral walls 22, 23 thinner than as they actually are were mounted on the frame 24.

In the above-described embodiment, the enclosure 2 has the light transmissive member 274 positioned at the front end and the light guide member 82 inserted into the insertion hole 27a formed on the light transmissive member 274 for introducing the light from the light emitting device 76 mounted on the substrate 3 into the insertion hole. This makes it possible to introduce the light from the light emitting device 76 into the insertion hole 27a of the light transmissive member 274 so that the insertion hole 27a of the light transmissive member 274 can appear as if emitting light, even when the light emitting device 76 is positioned apart from the light transmissive member 274.

In the above-described embodiment, the enclosure 2 has the projected portion 29 projecting from the end surface 281 of the rear end portion and having the curved surface 292 formed on the lower part thereof so as to be continuous from the end surface 281, and the buttons 84, 85 positioned in the opening formed on the curved surface 292. With the above, the buttons 84, 85 positioned on the curved surface 292 can prevent erroneous pressing of the buttons 84, 85.

Although an embodiment of the present invention has been described in the above, the present invention is not limited to the above described embodiment, and various modified embodiments are achievable for a person skilled in the art.

What is claimed is:

1. An electronic device, comprising:
a substrate having a data storage unit mounted thereon, the data storage unit incorporating a storage medium; and
a columned enclosure for storing the substrate in a standing posture, the enclosure having an axial direction directed in a vertical direction and a pair of lateral walls opposite to the substrate in a thickness direction of the substrate, wherein
when the axial direction of the enclosure is defined as a first direction, the thickness direction of the substrate is defined as a second direction, and a direction orthogonal to these directions is defined as a third direction, the pair of lateral walls has a curved shape curved so that middle portions in the third direction depart from the substrate in the second direction more than respective both ends in the third direction,
wherein the data storage unit is mounted on one side of the substrate in the second direction, and
the substrate is positioned offset to another side relative to a middle of the enclosure in the second direction.

2. The electronic device according to claim 1, wherein a distance in the second direction between each of the lateral walls in a pair and the middle portion of the substrate in the third direction is larger than a distance in the second direction between each of the lateral walls in a pair and each of the both ends of the substrate in the third direction.

3. The electronic device according to claim 1, wherein an interval between tip ends of the pair of lateral walls in the third direction is smaller than a total thickness of the substrate and the data storage unit.

4. The electronic device according to claim 1, further comprising a tuner unit mounted on the substrate, for obtaining a broadcasting signal of a channel selected, wherein the tuner unit is mounted on the one side of the substrate in the second direction.

5. The electronic device according to claim 1, further comprising a semiconductor chip mounted on the substrate, wherein the data storage unit is positioned on one side relative to a middle of the substrate in the third direction, and the tuner unit and the semiconductor chip are positioned on another side.

6. The electronic device according to claim 1, wherein
the enclosure has a frame provided between peripheries of the pair of lateral walls and enclosing the substrate, and
a notch is formed on an outer surface of the enclosure, extending between the periphery and the frame along the periphery.

7. The electronic device according to claim 6, wherein the peripheries of the pair of lateral walls each have a tapered shape in which an inner surface in the second direction is inclined toward outside.

8. The electronic device according to claim 1, wherein
the enclosure has
a light transmissive member placed on one end portion thereof in the third direction, and
a light guide member inserted in an insertion hole formed on the light transmissive member, for introducing light from a light emitting device mounted on the substrate to the insertion hole.

9. The electronic device according to claim 1, wherein the enclosure has
a projected portion projecting from one end surface thereof in the third direction and having a curved surface formed on one side of the projected portion in the first direction so as to be continuous from the end surface, and
a button placed in an opening formed on the curved surface.

* * * * *